United States Patent [19]

Noguchi et al.

[11] Patent Number: 5,623,380
[45] Date of Patent: Apr. 22, 1997

[54] CIRCUIT AND METHOD FOR CONTROLLING HEAD TRACKING BASED ON AN AVERAGE OF REPRODUCED PILOT SIGNALS FROM EACH RECORDING UNIT

[75] Inventors: Masayoshi Noguchi, Chiba; Makoto Yamada, Tokyo, both of Japan

[73] Assignee: Sony Corporation, Tokyo, Japan

[21] Appl. No.: 463,066

[22] Filed: Jun. 5, 1995

Related U.S. Application Data

[63] Continuation of Ser. No. 200,930, Feb. 22, 1994, abandoned, which is a continuation of Ser. No. 37,705, Mar. 24, 1993, abandoned, which is a continuation of Ser. No. 608,002, Nov. 1, 1990, abandoned.

[30] Foreign Application Priority Data

Dec. 15, 1989 [JP] Japan ................................ 1-324993

[51] Int. Cl.$^6$ ................................................ G11B 15/467
[52] U.S. Cl. ........................................ 360/77.15; 360/77.13
[58] Field of Search ............................. 360/77.14, 77.15, 360/77.13, 77.16

[56] References Cited

U.S. PATENT DOCUMENTS

| 4,755,893 | 7/1988 | Yamada et al. | 360/77.15 |
|---|---|---|---|
| 4,843,495 | 6/1989 | Georgis et al. | 360/77.15 |
| 5,008,764 | 4/1991 | Yoshida et al. | 360/77.15 |
| 5,055,952 | 10/1991 | Noh | 360/77.14 |
| 5,083,228 | 1/1992 | Uchida et al. | 360/77.14 |
| 5,119,249 | 6/1992 | Uchikoshi | 360/77.15 |
| 5,148,331 | 9/1992 | Kashida et al. | 360/77.15 |

FOREIGN PATENT DOCUMENTS

| 0103463A3 | 3/1984 | European Pat. Off. . |
|---|---|---|
| 0307586A1 | 3/1989 | European Pat. Off. . |
| 0356959A2 | 3/1990 | European Pat. Off. . |
| 63-52363 | 3/1988 | Japan . |
| 63-76140 | 4/1988 | Japan . |
| 63-217555 | 9/1988 | Japan . |

OTHER PUBLICATIONS

Patent Abstracts of Japan, vol. 13, No. 9 (P–811), Jan. 11, 1989; and JP–A–63 217 555.
Patent Abstracts of Japan, vol. 12, No. 307 (P–747), Aug. 22, 1988; and JP–A–63 076 140.
Patent Abstracts of Japan, vol. 12, No. 271 (P–736), Jul. 28, 1988; and JP–A–63 052 363.

*Primary Examiner*—W. R. Young
*Assistant Examiner*—James T. Wilson
*Attorney, Agent, or Firm*—Limbach & Limbach L.L.P.

[57] ABSTRACT

In a tracking control circuit for a rotary head type magnetic recording/reproducing apparatus, the feed speed of the magnetic tape is controlled in response to an average value of plural tracking error information data detected from at least two or more locations on a recording track, whereby a tracking error can be corrected with high accuracy even when the plural tracking error information data are reproduced at unequal intervals.

6 Claims, 7 Drawing Sheets

FIG. 1 PRIOR ART (A)           (B)

PRIOR ART

CIRCUIT AND METHOD FOR CONTROLLING HEAD TRACKING BASED ON AN AVERAGE OF REPRODUCED PILOT SIGNALS FROM EACH RECORDING UNIT

This is a continuation of application Ser. No. 08/200,930, filed Feb. 22, 1994, now abandoned, which was a continuation of Ser. No. 08/037,705, filed Mar. 24, 1993, now abandoned, which is a continuation of application Ser. No. 07/608,002 filed on Nov. 1, 1990, now abandoned.

BACKGROUND OF THE INVENTION

The present invention relates to a tracking control circuit and method which are suitable for use in a rotary head type digital tape recorder by way of example.

A rotary head type digital audio tape recorder (hereinafter referred to as DAT) has conventionally been used as a magnetic recording/reproducing apparatus capable of recording an audio signal with high density.

The DAT is designed such that input audio data are recorded on a magnetic tape wound around a rotary drum at a predetermined winding angle by using a rotary head arranged on the rotary drum, or the recorded audio data recorded on the magnetic tape are reproduced (played back) by using the rotary head.

In this connection, to properly reproduce the recorded audio data recorded on the magnetic tape, it is required that the rotary head precisely tracks over recording tracks of the magnetic tape.

To this end, a tracking control method with the so-called ATF (automatic track following) technique has been employed in the DAT.

Figure 1:
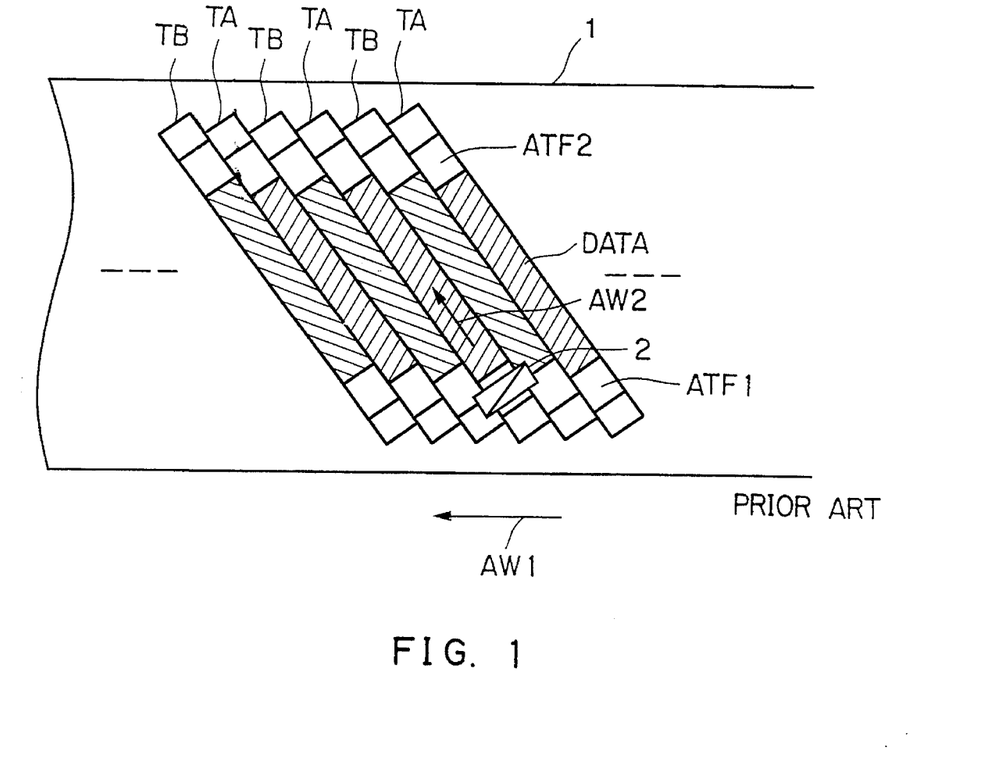
FIG. 1 is a schematic view for explaining recording tracks with DAT format.

More specifically, as shown in FIG. 1, a magnetic tape 1 on which audio data are recorded in accordance with the DAT format has formed thereon recording tracks TA, TB successively and alternately recorded by a rotary head 2, having positive and negative azimuth angles, as indicated by the diagonal line patterns, in an oblique direction AW2 relative to the running direction AW1 of the magnetic tape 1.

At predetermined positions in the lower and upper ends of each of the recording tracks TA, TB, there are respectively formed first and second ATF recording regions ATF1 and ATF2 in each of which an ATF synchronizing signal and an ATF pilot signal are recorded.

Between the first and second ATF recording regions ATF1 and ATF2, there is formed a data recording region DATA in which digital audio data are recorded with each pair of first and second recording tracks TA and TB being as one recording unit (i.e. a so-called interleave unit).

In the reproducing operation with the above arrangement, when the ATF synchronizing signals in the first and second ATF recording regions ATF1 and ATF2 of one recording track TA, for example, are detected based on a reproduced RF (radio frequency) signal obtained from the rotary head 2, the ATF pilot signals recorded on the preceding and succeeding recording tracks TB adjacent to the recording track TA are read out dependent on the detection timing of the ATF synchronizing signals in a time-sharing manner, whereby first and second ATF error signals corresponding to offtrack amounts at the lower and upper ends of the magnetic tape 1 are obtained dependent on a level difference between the ATF pilot signals read-out.

Thus, by controllably driving the running speed of the magnetic tape 1 in accordance with the first and second ATF error signals, the rotary head 2 can precisely track over the predetermined recording track TA of the magnetic tape 1.

Figure 2:
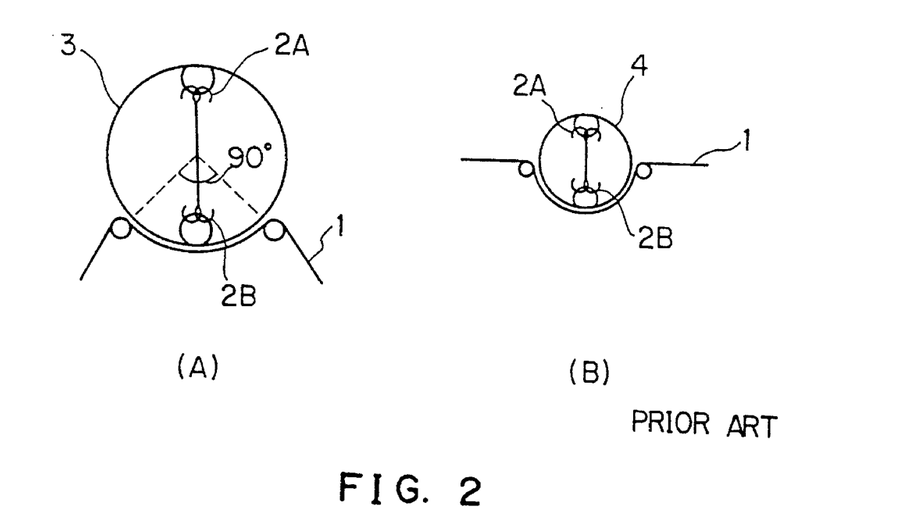

In practice, as shown in FIG. 2(A), a DAT's rotary heads 2A, 2B having positive and negative azimuth angles, respectively are arranged on a rotary drum 3 with a diameter of 90 mm to be spaced from each other by an angular spacing of 180 degrees, while the magnetic tape 1 is wound around the rotary drum 9 over an angular span of 90 degrees.

Figure 3:
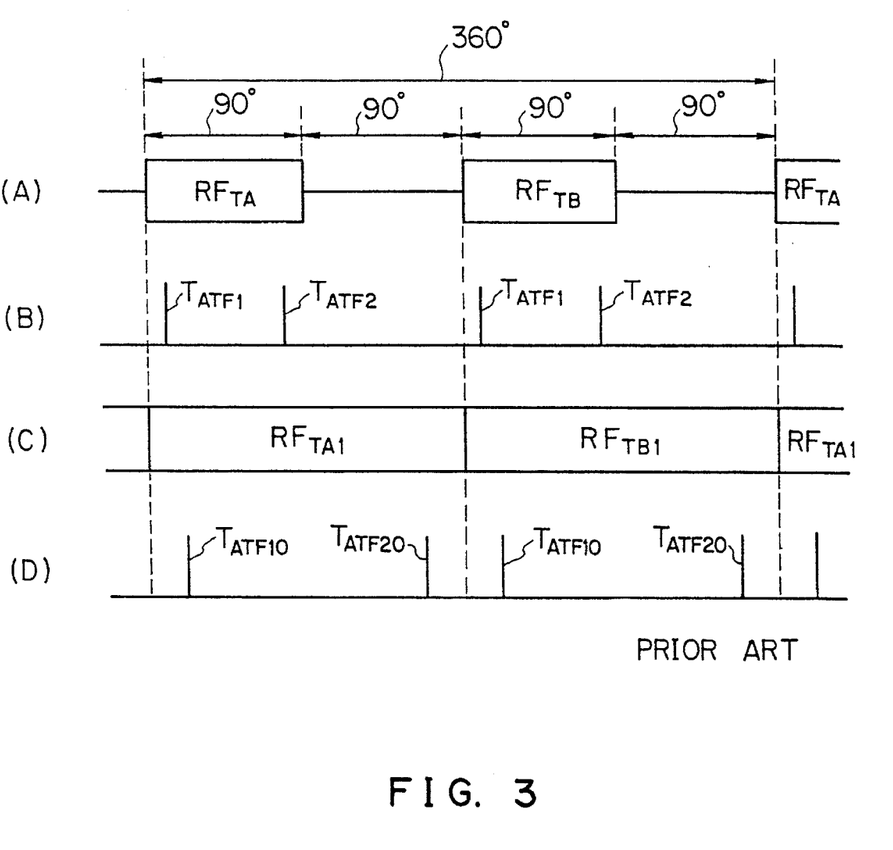

This DAT is controlled such that while the rotary drum 3 rotates once, the first and second rotary heads 2A and 2B scan once over the first and second recording tracks TA and TB on the magnetic tape 1, respectively, and send out a reproduced RF signal $RF_{TA}$ resulting from the first rotary head 2A reproducing the first recording track TA during the period while the rotary drum 3 is rotating from 0 degrees to 90 degrees and a reproduced RF signal $RF_{TB}$ resulting from the second rotary head 2B reproducing the second recording track TB during the period while the rotary drum 3 is rotating from 180 degrees to 270 degrees, as shown in FIG. 3(A), taking as a reference the timing at which the first rotary head 2A starts scanning the first recording track TA, for example.

During the periods while the rotary drum 3 is rotating from 90 degrees to 180 degrees and from 270 degrees to 360 degrees, neither the first nor the second rotary heads 2A, 2B are brought into contact with the magnetic tape 1.

The DAT detects the ATF synchronizing signals from the reproduced RF signals $RF_{TA}$ and $RF_{TB}$ at timing points $T_{ATF1}$, $T_{ATF2}$ spaced at substantially equal intervals dependent on the recording format, as shown in FIG. 3(B), and it also samples an ATF error signal given by the difference between the ATF pilot signals obtained in accordance with the detected ATF synchronizing signals. The DAT then holds the sampling value until the timing of the subsequent ATF synchronizing signal, and controllably drives the feed speed of the magnetic tape 1.

In some types of conventional DATs, a rotary drum 4 with a diameter of 15 mm is used in place of the rotary drum 3 with a diameter of 30 mm to reduce the size of the mechanical mechanism section.

In this type DAT, as shown in FIG. 2(B), the rotary heads 2A and 2B are arranged on the rotary drum 4 with a diameter of 15 mm to be spaced from each other by an angular spacing of 180 degrees, while the magnetic tape 1 is wound around the rotary drum 4 over an angular span of 180 degrees.

This DAT is controlled such that while the rotary drum 4 rotates once, the first and second rotary heads 2A and 2B scan once over the first and second recording tracks TA and TB on the magnetic tape 1, respectively, and send out a reproduced RF signal $RF_{TA1}$ resulting from the first rotary head 2A reproducing the first recording track TA during the period while the rotary drum 4 is rotating from 0 degrees to 180 degrees and a reproduced RF signal $RF_{TB1}$ resulting from the second rotary head 2B reproducing the second recording track TB during the period while the rotary drum 4 is rotating from 180 degrees to 380 degrees, as shown in FIG. 3(C), taking as a reference the timing at which the first rotary head 2A starts scanning the first recording track TA, for example.

The DAT detects the ATF synchronizing signals from the reproduced RF signals $RF_{TA1}$ and $RF_{TB1}$ at the timing points $T_{ATF10}$, $T_{ATF20}$, dependent on the recording format, as shown in FIG. 3(D), and it also samples an ATF error signal given by a difference between the ATF pilot signals obtained in accordance with the detected ATF synchronizing signals.

The DAT then holds the sampling value until the timing of the subsequent ATF synchronizing signal, and controllably drives the feed speed of the magnetic tape 1.

In this case, however, since the timing points $T_{ATF10}$, $T_{ATF20}$ of the ATF synchronizing signals are not obtained with equal intervals, tracking control can be made using the lower end of the recording tracks TA, TB, but not on the upper end thereof, possibly causing an off-track condition.

This problem is attributable to the fact that the ATF error signal is sampled at timing points of unequal intervals, and the sampling value is held for the same time constant until the timing of the subsequent ATF synchronizing signal.

It is therefore conceivable that the above problem is solved by changing the time constant for sample holding dependent on the interval of the ATF synchronizing signals detected. But this is unsatisfactory for practical use due to another problem of complicating the circuit and increasing its size.

SUMMARY OF THE INVENTION

In view of the foregoing, an object of the present invention is a tracking control circuit which can properly perform tracking control even when the ATF error signal is obtained at the timing points of unequal intervals.

The above object is obtained by the present invention of a tracking control circuit for a magnetic recording/reproducing apparatus of the type having rotary drum mounted, first and second rotary heads having different azimuth angles from each other for scanning a magnetic tape and reproducing recorded data from a set of first recording tracks recorded on the magnetic tape at a first azimuth angle and set of second recording tracks recorded on the magnetic tape at a second azimuth angle and inbetween the first set of recording tracks, the first azimuth angle and the second azimuth angle being in different oblique directions relative to the running direction of the magnetic tape. The improvement according to the present invention comprises means for reproducing ATF synchronizing signals from a given second recording track and ATF pilot signals recorded in two locations on each of the first recording tracks on opposite sides of the given second recording track, generating plural tracking error information data from the reproduced ATF pilot signals by digitally sampling and converting the reproduced ATF pilot signals by means of the reproduced synchronizing signals into digital ATF pilot data, subtracting the digital ATF pilot data from the corresponding two locations of the first recording tracks on opposite sides of the given second recording track, and repeating these steps for at least the next recording track after the given second recording track. Tracking control means supplied with the plural tracking error information data controls the feed speed of the magnetic tape relative to the first and second rotary heads dependent on an average value of the plural tracking error information data. In this way the unequal intervals of the timing points are negated as a problem.

With the above arrangement, by converting the ATF error signal to digital data and carrying out the tracking control with the aid of the average value for each recording unit, a simplified tracking control circuit is achieved, even when the ATF error signal is reproduced at timing points spaced at unequal intervals.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2(A–B) represents schematic views for explaining rotary drum arrangements for different types of DATs;

FIG. 3(A–D) shows a timing chart for explaining tracking control with the conventional ATF technique;

FIG. 7(A–H) shows a timing chart for explaining an average value processing sequence employed by the tracking control circuit depicted in FIG. 5.

DETAILED DESCRIPTION OF THE INVENTION

Hereinafter, one embodiment of the present invention will be described in more detail with reference to the drawings.

(1) Entire Configuration of a DAT

Figure 4:
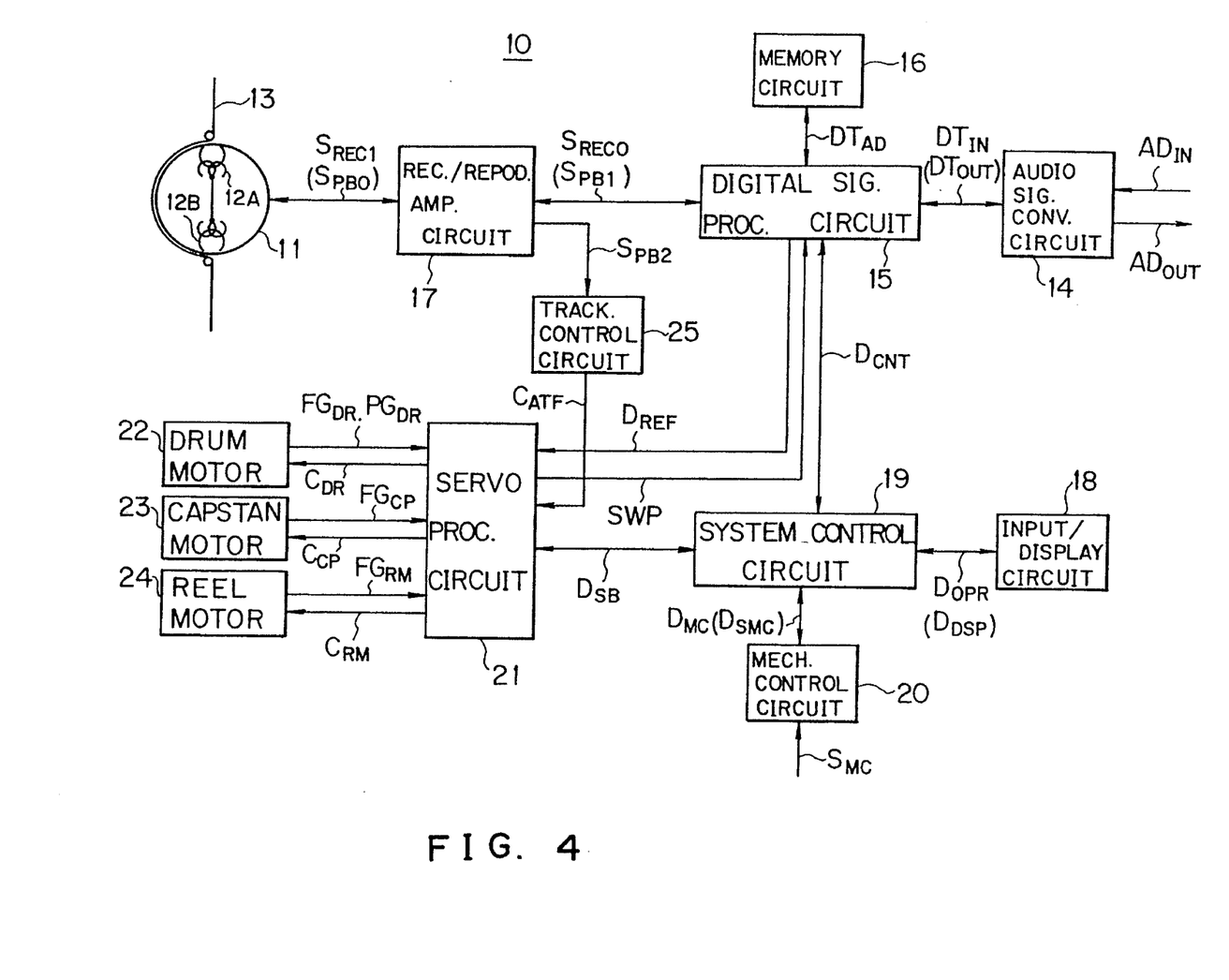
FIG. 4 is a block diagram showing the entire configuration of a rotary head type digital audio tape recorder in which the tracking control circuit of the invention is employed.

In FIG. 4, reference numeral 10 denotes the entire configuration of a rotary head type digital audio tape recorder (DAT) as a whole. The DAT is designed such that desired audio signals $AD_{IN}$ and $AD_{OUT}$ can be recorded on or reproduced from a magnetic tape 13 wound around a rotary drum 11 over a predetermined angular span by using a pair of rotary heads 12A, 12B provided on the rotary drum 11.

In this DAT 10, the input audio signal $AD_{IN}$ is first applied to an audio signal conversion circuit 14 during the recording operation. Although not shown in the figure, the audio signal conversion circuit 14 has a low-pass filter and an analog/digital conversion circuit, as a recording processing system, for converting the applied audio signal $AD_{IN}$ to digital data and sending it, as input digital data $DT_{IN}$, to a recording processing system of a digital signal processing circuit 15.

The recording processing system of the digital signal processing circuit 15 writes the applied digital data $DT_{IN}$, as 8-bit input audio data $DT_{AD}$, into a memory circuit 16 constituted by a RAM (random access memory).

Although not shown in the figure, the recording processing system of the digital signal processing circuit 15 comprises an error correcting sign generator, an interleave processing circuit, an 8–10 modulation circuit, a parallel/serial conversion circuit and other circuits.

With such an arrangement, the error correcting sign generator first reads out the input audio data $DT_{AD}$ written into the memory circuit 16 and produces an error correcting parity, followed by writing the error correcting parity into the memory circuit 16.

The above writing and reading processes into and from the memory circuit 16 are all performed using addresses selected corresponding to the data interleave and generated by the interleave processing circuit. The input audio data $DT_{AD}$ with the added error correcting parity is read out by the 8–10 modulation circuit.

The 8–10 modulation circuit converts the 8-bit input audio data $DT_{AD}$ to 10-bit data suitable for magnetic recording by the rotary heads 12A, 12B, while adding a synchronizing signal, an address signal, a subcode signal, an ATF (automatic track following) signal, etc. thereto.

The recording processing system of the digital signal processing circuit 15 converts the recording data thus obtained to a recording signal $S_{RECO}$ in the form of serial data through an internal serial/parallel conversion circuit (not shown) and then sends out the signal $S_{RECO}$ to a recording processing system of a recording/reproducing amplification circuit 17.

Although not shown in the figure, the recording processing system of the recording/reproducing amplification circuit 17 comprises a recording signal amplification circuit, a rotary transformer, etc., and amplifies the applied recording signal $S_{RECO}$ to produce an amplified recording signal $S_{REC1}$ which is supplied to the rotary heads 12A, 12B on the rotary drum 11 through the rotary transformer. Thus, the input audio signal $D_{IN}$ can be recorded on a predetermined recording track of the magnetic tape 13. The track pattern thus produced of first and second recording tracks recorded on the magnetic tape at corresponding different azimuth angles from each other in an oblique direction relative to the running direction of the magnetic tape is the same as that shown in FIG. 1.

In this DAT 10, the recording or reproducing operation is selectively controlled in accordance with operating data $D_{OPR}$ applied from an input/display circuit 18 to a system control circuit 19 constituted by a microcomputer.

Although not shown in the figure, the input/display circuit 18 comprises a microcomputer having a key matrix as an input means with operating elements, for example, and a display panel having liquid crystal display elements as a display means.

With such an arrangement, the input/display circuit 18 outputs the operating data $D_{OPR}$ in response to actuation of the operating elements by a user and also presents an indication on the display panel in accordance with display data $D_{DSP}$ supplied from the system control circuit 19.

During the recording operation, the system control circuit 19 produces mechanical control data $D_{MC}$, signal processing control data $D_{CNT}$ and servo processing control data $D_{SB}$ in accordance with both system information supplied in advance and the operating data $D_{OPR}$ applied from the input/display circuit 18, and sends out these data to a mechanical control circuit 20, the digital signal processing circuit 15 and a servo processing circuit 21, respectively.

In practice, during the recording operation, the servo processing circuit 21 sends out a drum drive signal $C_{DR}$, a capstan drive signal $C_{CP}$ and a reel drive signal $C_{RM}$ to a drum motor 22, a capstan motor 23 and a reel motor 24, respectively, in accordance with the servo processing control data $D_{SB}$ applied from the system control circuit 19 for rotatively driving the rotary drum 11 at a predetermined rotational speed and running the magnetic tape 13 at a predetermined speed.

At this time, a drum phase signal $PC_{DR}$ and a drum frequency signal $FG_{DR}$, a capstan frequency signal $FG_{CP}$ and a reel frequency signal $FG_{RM}$ are fed back to the servo processing circuit 21 from the drum motor 22, the capstan motor 23 and the reel motor 24, respectively, thereby forming a speed servo loop and/or a phase servo loop.

In addition, an internal reference signal $D_{REF}$ representing one interleave cycle during the recording operation is supplied to the servo processing circuit 21 from the digital signal processing circuit 15. As a result, the servo processing circuit 21 executes speed servo processing and/or phase servo processing in accordance with the internal reference signal $D_{REF}$, while it produces a switching reference signal SWP for the rotary heads 12A, 12B in accordance with the drum phase signal $PC_{DR}$ and the drum frequency signal $FG_{DR}$ both applied thereto. This is followed by sending out the switching reference signal SWP to the digital signal processing circuit 15.

Further, the mechanical control circuit 20 controllably drives a cassette loading mechanism (not shown) for a DAT cassette, a tape loading mechanism (no shown) for the magnetic tape 13, etc., in accordance with the mechanical control data $D_{MC}$ applied from the system control circuit 19, while it produces mechanical information data $D_{SMC}$ in accordance with sensor information $S_{MC}$ supplied from the mechanical mechanism section (not shown) followed by sending it out to the system control circuit 19.

In the DAT 10 thus arranged during the reproducing operation, the servo processing circuit 21 first rotatively drives the drum motor 22 at a rotational speed corresponding to the servo processing control data $D_{SB}$ applied from the system control circuit 19 and at a phase in synchronism with the internal reference signal $D_{REF}$ for the reproducing operation supplied from the digital signal processing circuit 15, thereby forming a speed servo loop and a phase servo loop.

Under this condition, a reproduced signal $S_{PBO}$ obtained from the rotary heads 12A, 12B is applied to the reproducing processing system of the recording/reproducing amplification circuit 17 which, although not shown in the figures, includes a rotary transformer, a reproduced signal amplification circuit (35—FIG. 5) and a waveform equalizing circuit. A resulting amplified reproduced signal $S_{PB2}$ is supplied to a tracking control circuit 25, while a reproduced digital signal $S_{PB1}$ obtained through a binary-coding circuit built into the circuit 17 is supplied to a reproducing processing system of the digital signal processing circuit 15.

In the case of this DAT 10, the tracking control circuit 25 is designed to perform tracking control with the ATF technique, for example.

Figure 5:
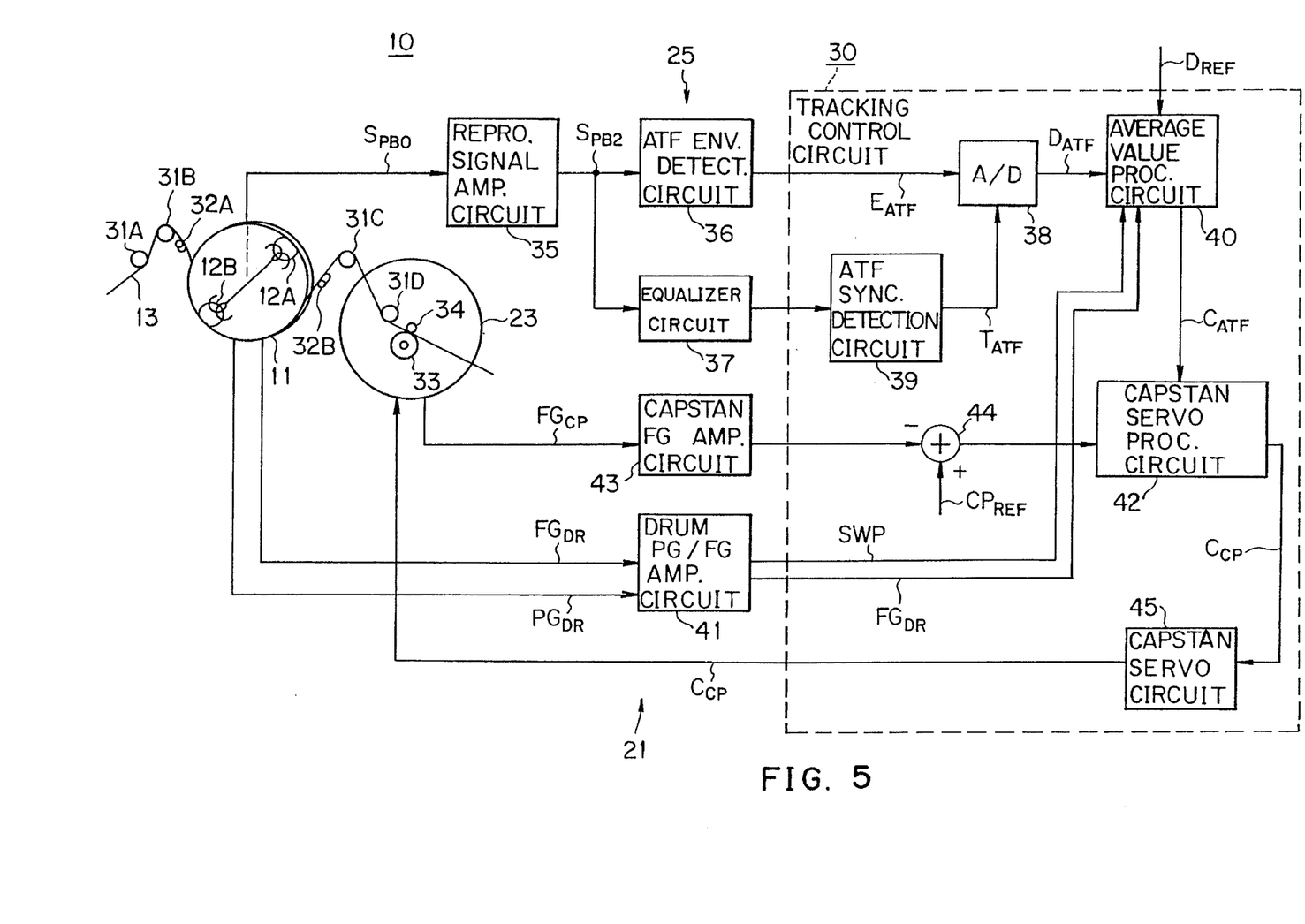
FIG. 5 is a block diagram showing one embodiment of a tracking control circuit according to the present invention.

More specifically, the tracking control circuit 25 comprises an equalizer circuit (37—FIG. 5) for detecting the synchronizing signal and an ATF envelope detection circuit (36—FIG. 5). In accordance with the timing to detect the synchronizing signal in the reproduced digital signal $S_{PB1}$ applied thereto, the tracking control circuit 25 detects the ATF signal from the envelope detection signal and produces ATF control data $C_{ATF}$ in accordance with the ATF signal, followed by sending it out to the servo processing circuit 21.

The servo processing circuit 21 controllably drives the capstan motor 23 in accordance with the ATF control signal $C_{ATF}$, whereby an ATF servo loop is formed in such a manner as to allow the rotary heads 12A, 12B to precisely trace over the recording tracks of the magnetic tape 13.

After the establishment of such an ATF servo loop, the reproducing processing system of the digital signal processing circuit 15 starts the reproducing process for the reproduced digital signal $S_{PB1}$ applied thereto.

Although not shown in the figure, the reproducing processing system of the digital signal processing circuit 15 comprises a clock reproducing circuit constituted by a PLL (phase locked loop) circuit, a 10-8 demodulation circuit, an error detecting/correcting circuit, a deinterleave processing circuit, an interpolation circuit, and other circuits.

With such an arrangement, the digital signal processing circuit 15 first detects, in the olock reproducing circuit, a reproduced clock signal which is contained in the reproduced digital signal $S_{PB1}$.

Upon detecting the synchronizing signal in the reproduced digital signal $S_{PB1}$, the 10-8 demodulation circuit performs 10–8 demodulation for every 10 bits of the reproduced digital signal $S_{PB1}$ in accordance with the reproduced clock signal detected by the clock reproducing circuit, and then writes the resulting 8-bit data, as reproduced audio data $DT_{AD}$, into the memory circuit 16 successively.

The reproduced audio data $DT_{AD}$ thus written into the memory circuit 16 is read out by the error detecting/ correcting circuit (not shown) to detect the presence or absence of data error. In the presence of data error, the error detecting/correcting circuit performs an error correcting process using an error correcting parity, and writes both the data having been corrected in error and the correction result into the memory circuit 16.

The above writing and reading processes into and from the memory circuit 16 are all performed using addresses selected corresponding to the data deinterleave and generated by the deinterleave processing circuit (not shown). The reproduced audio data $DT_{AD}$ having been subjected to the error detection correcting process is read out by the interpolation circuit (not shown).

Then, for the data whose errors could not be corrected, the interpolation circuit interpolates by calculating an average value of that data from the preceding and succeeding data, or the like, and sends out the calculated result, as reproduced digital data $DT_{OUT}$, to a reproducing processing system of the audio signal conversion circuit 14.

Although not shown in the figure, the reproducing processing system of the audio signal conversion circuit 14 comprises a digital/analog conversion circuit and a low-pass filter for converting the reproduced digital data $DT_{OUT}$ to an analog signal and sending it out as reproduced audio signal $AD_{OUT}$.

Thus, the recording tracks of the magnetic tape 13 are read out by the rotary heads 12A, 12B on the rotary drum 11, and the recorded data recorded on the magnetic tape 13 are reproduced to obtain the reproduced audio signal $AD'_{OUT}$.

(2) Embodiment of Tracking Control Circuit

In FIG. 5, the components corresponding to those in FIG. 4 are denoted by the same reference numerals, and reference numeral 30 denotes a tracking control circuit according to the present invention as a whole. In practice, the magnetic tape 13 drawn out from a feed reel (not shown) of a tape cassette is guided by first and second guide pins 31A and 31B and wound by a pair of slanted guides 32A and 32B around the rotary drum 11 over an angular span of 180 degrees, for example.

Afterward, the magnetic tape 13 is sandwiched between third and fourth guide pins 31C and 31D, between a pinch roller 33 and a capstan 34 for driving the magnetic tape 13, and then taken up by a wind-up reel of the tape cassette (not shown). In this DAT 10, the magnetic tape 13 is thus drawn from the tape cassette and loaded on the rotary drum 11 into the form of an M shaped path.

In the case of this embodiment, the rotary drum 11 has a diameter of 15 mm, as mentioned above in reference to FIG. 2(B). The reproduced signal $S_{PB0}$, obtained by playing back the recording tracks TA, TB on the magnetic tape 13 by the rotary heads 12A, 12B with an angular spacing of 180 degrees from each other, is applied to a reproduced signal amplification circuit 35 which is part of the recording/ reproducing amplification circuit 17.

The amplified reproduced signal $S_{PB2}$ obtained from the reproduced signal amplification circuit 35 is applied to both the ATF envelope detection circuit 36 and the equalizer circuit 37.

Although not shown in the figure, the ATF envelope detection circuit 36 includes a low-pass filter and detects an envelope $E_{ATF}$ of the ATF pilot signal contained in the amplified reproduced signal $S_{PB2}$ and then sends out the envelope to a subsequent analog/digital conversion circuit 38.

Further, the equalizer circuit 37 equalizes the wave-form of the amplified reproduced signal $S_{PB2}$ and supplies the equalized signal to a subsequent ATF synchronism detection circuit 39. In accordance with the timing of the synchronizing signal thus obtained, a timing pulse $T_{ATF}$ of the ATF pilot signal is sent out to the analog/digital conversion circuit 38.

The analog/digital conversion circuit 38 samples the envelope $E_{ATF}$ of the ATF pilot signal applied from the ATF envelope detection circuit 36 in accordance with the timing pulse $T_{ATF}$ of the ATF pilot signal applied from the ATF synchronism detection circuit 39, and converts the sampled envelope to digital data, followed by sending out the digital data, as ATF pilot data $D_{ATF}$, to an average value processing circuit 40.

Figure 6A:
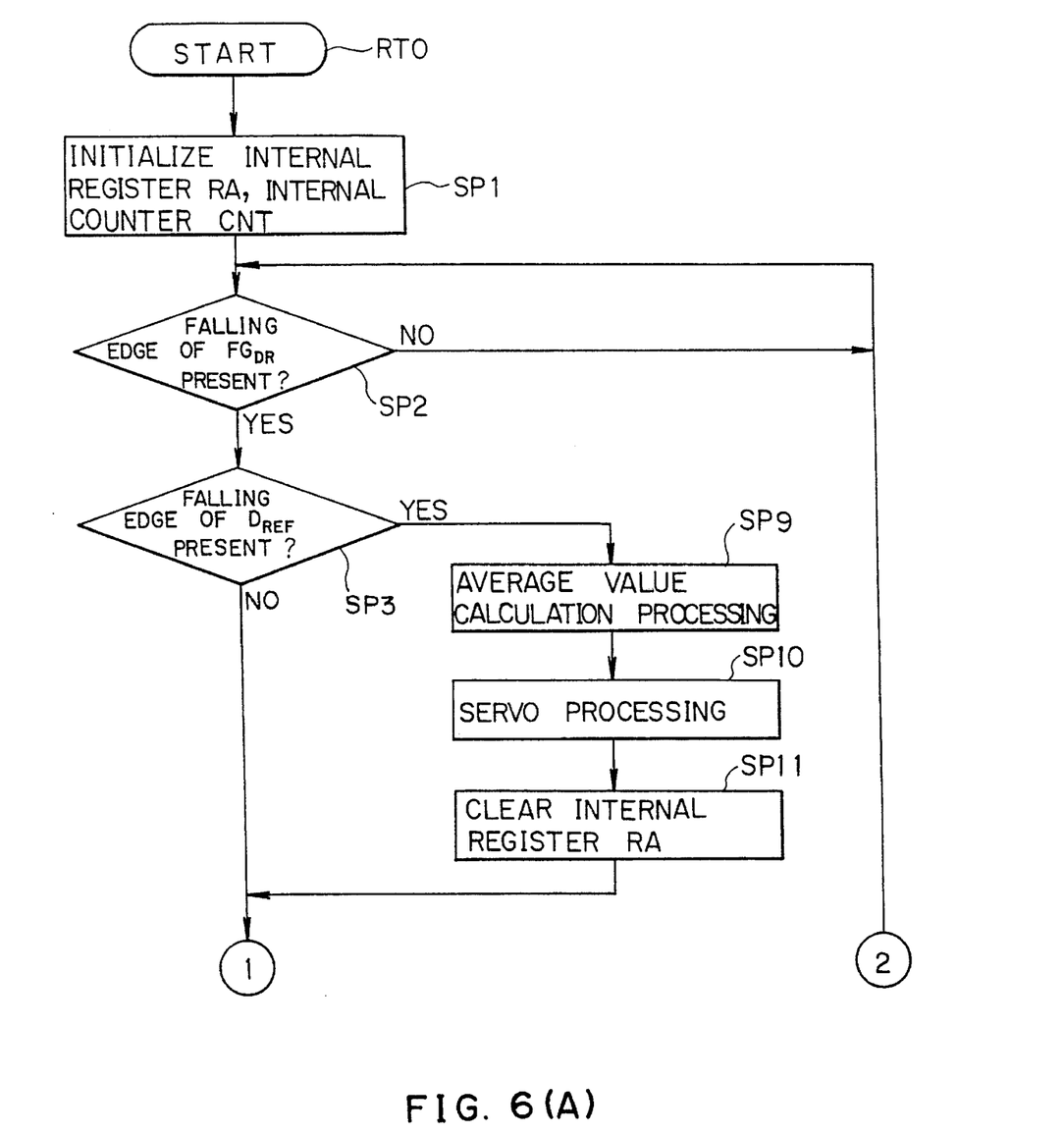
FIGS. 6A and 6B are flowcharts for explaining the operation of the tracking control circuit depicted in FIG. 5.
Figure 6B:
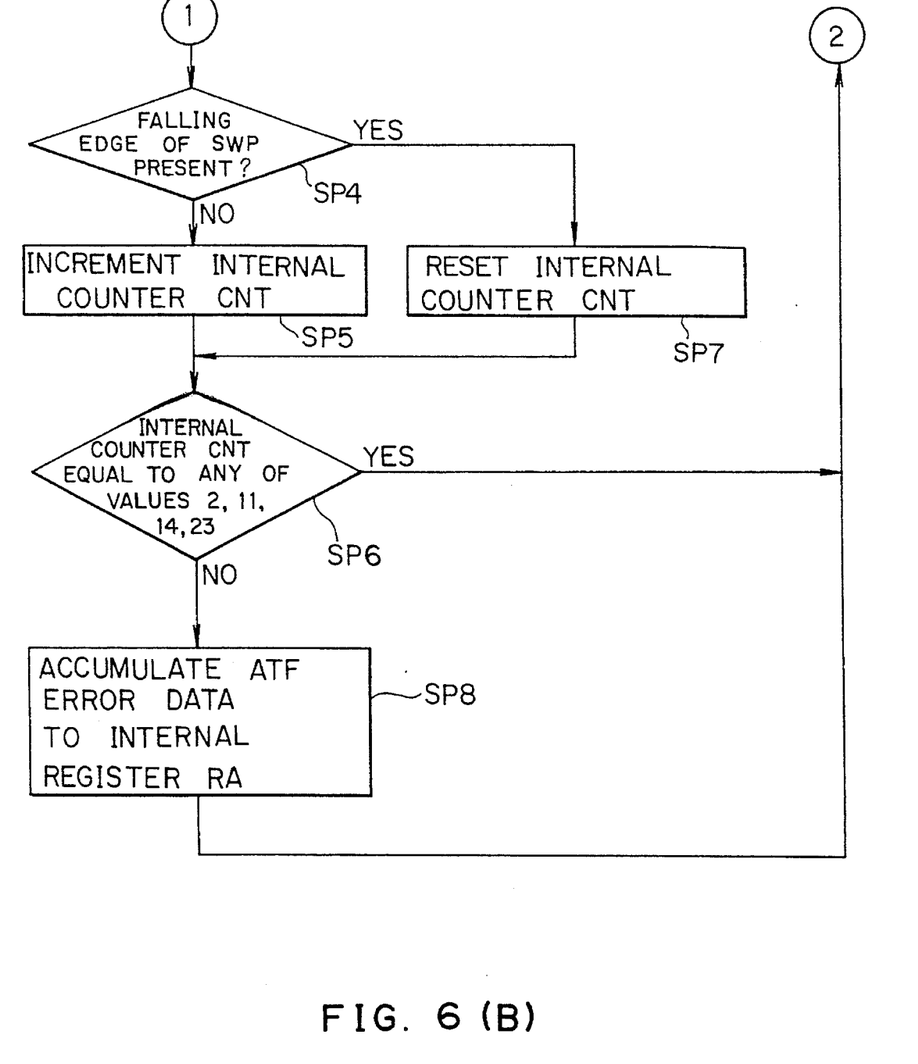

Although not shown in the figure, the average value processing circuit 40 is constituted by a microcomputer and executes an average value processing sequence RTO, as shown in FIG. 6, for the ATF pilot data $D_{ATF}$ applied thereto by referring to the internal reference signal $D_{REF}$ applied from the digital signal processing circuit 15, and the drum frequency signal $FG_{DR}$ as well as the switching reference signal SWP for the rotary heads 12A, 12B applied from a drum PG/FG amplification circuit 41 of the servo processing circuit 21. The resulting ATF control data $C_{ATF}$ are sent to a capstan servo processing circuit 42.

The capstan frequency signal $FG_{CP}$ obtained through a capstan FG amplification circuit 43 of the servo processing circuit 21 is subtracted from an externally supplied capstan frequency reference signal $CP_{REF}$ in an subtraction circuit 44, and the subtracted result is applied to the capstan servo processing circuit 42.

Thus, in accordance with the ATF control data $C_{ATF}$, the capstan frequency signal $FG_{CP}$ and the capstan frequency reference signal $CP_{REF}$, the capstan servo processing circuit 42 produces a capstan drive signal $C_{CP}$ and then supplies it to the capstan motor 23 through a capstan drive circuit 45 of the servo processing circuit 21.

The ATF servo loop is entirely formed in this way, thereby allowing the rotary heads 12A, 12B to trace the predetermined recording tracks TA, TB (FIG. 1) in a just tracking condition.

Referring now to FIG. 6, a CPU (not shown) of the average value processing circuit 40 executes the average value processing sequence RTO upon designation in the servo processing control data $D_{SB}$ applied from the system control circuit 19. Specifically, it sets a value "0" to an internal register RA and clears an internal counter CNT for initialization in a step SP1 and waits for the arrival of a falling edge of the drum frequency signal $FG_{DR}$ (FIG. 7(A)) in a decision loop of a next step SP2.

In this case, the drum frequency signal $FG_{DR}$ is set to have 24 cycles corresponding to one rotation of the rotary drum 11, i.e., 1 cycle of the switching reference signal SWP.

Figure 7:
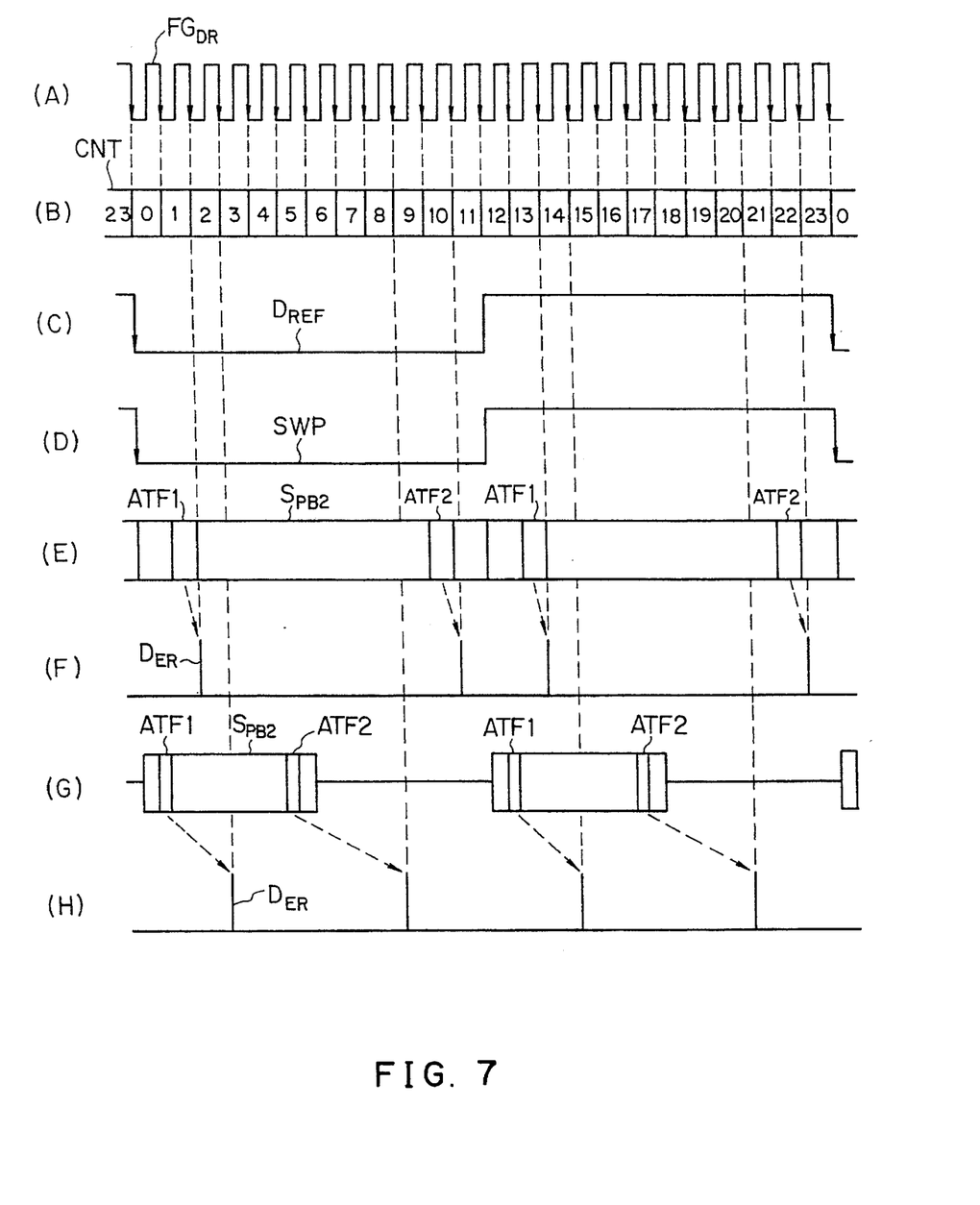

Then, upon detecting the falling edge of the drum frequency signal $FG_{DR}$ in the step SP2, the CPU determines the presence or absence of a falling edge of the internal reference signal $D_{REF}$ (FIG. 7(C)) in a next step SP3. If the decision result is NO, the CPU proceeds to a next step SP4 to determine the presence or absence of a falling edge of the switching reference signal SWP (FIG. 7(D)).

If the decision result in the step SP4 is NO, the CPU increments the internal counter CNT (FIG. 7(B)) and proceeds to a step SP6. If that result is YES, it resets the internal counter CNT to a value "0" in a step SP7 and proceeds to the step SP6.

In the step SP6, the CPU determines whether or not the value of the internal counter CNT is equal to any of the values "2, 11, 14, or 23". If the result is NO, it returns to the above step SP2.

Conversely, if the decision result in the step SP6 is YES, the CPU proceeds to a next step SP8 to determine the ATF error data $D_{ER}$ (FIG. 7(F)) by using the ATF pilot data $D_{ATF}$ in the reproduced amplified signal $S_{PB2}$ (FIG. 7(E)) being input and corresponding to the first and second recording tracks TA, TB, and returns to the above step SP2 after accumulating the ATF error data $D_{ER}$ to the inner register RA.

If the decision result in the above step SP3 is YES, the CPU proceeds to a step SP9 to divide the ATF error data $D_{ER}$, which have been accumulated to the internal register RA, by a value "4" for computing average value data $D_{ERAV}$, and loads it into the internal register RA, thus executing the average value calculating process.

In a subsequent step SP10, the CPU sends out the average value data $D_{ERAV}$ loaded in the internal register RA, as the ATF control data $C_{ATF}$, to the capstan servo processing circuit 42, thus executing the servo process. Afterwards it proceeds to a next step SP11 to clear the internal register RA to a value "0", followed by going to the step SP4.

In the tracking control circuit 30 thus arranged, the average value data $D_{ERAV}$ of the ATF error data $D_{ER}$ in the reproduced amplified signal $S_{PB2}$ being applied, which corresponds to the first and second recording tracks TA, TB, is detected for one recording unit, i.e., 1 cycle of the internal reference signal $D_{REF}$. Thus, to perform tracking control by using the detected average value data $D_{ERAV}$, it is possible to properly carry out the tracking control even when the ATF error signal is reproduced at the timing points of unequal intervals as experienced in the case of the DAT 10 employing the rotary drum 11 with a diameter of 15 mm.

With the above arrangement, by converting the ATF error signal to digital data and carrying out the tracking control with the aid of the average value for each recording unit, a simplified tracking control circuit is achieved which enables tracking control even when the ATF error signal is reproduced at timing points having unequal intervals.

In practice, in the case of this DAT 10, the equalizer circuit 37 is arranged on the same integrated circuit as the digital signal processing circuit 16. Also the tracking control circuit 30, including the analog/digital conversion circuit 38, the ATF synchronism detection circuit 38, the average value processing circuit 40, the capstan servo processing circuit 42 and the subtraction circuit 44, is arranged on the same integrated circuit as the servo processing circuit 21. This still further simplifies the circuit configuration of the DAT 10 as a whole and improves reliability.

(3) Other Embodiments (3-1) The foregoing embodiment has been explained in connection with the case of applying the present invention to a DAT using a rotary drum with a diameter of 15 mm. However, the present invention is not limited to that case and is also widely applicable to rotary drums with a diameter of 30 mm or other various values.

In the case of using a rotary drum with a diameter of 30 mm, by way of example, the reproduced amplified signal $S_{PB2}$ has an envelope waveform as shown in FIG. 7(G). Therefore, by accumulating the ATF error data at the timing of the internal counter CNT taking any of count values "3, 9, 16, or 21" in the step SP8 of the average value processing sequence RTO, a similar effect to that of the foregoing embodiment can be achieved.

(3-2) Although the foregoing embodiment has been explained as setting the drum frequency signal $FG_{DR}$ to have 24 cycles corresponding to one rotation of the rotary drum 11, i.e., 1 cycle of the switching reference signal SWP, the drum frequency signal $FG_{DR}$ is not limited to that example. By setting the drum frequency signal $FG_{DR}$ to have a cycle corresponding to a multiplication of a predetermined integer of the above 1 cycle, a similar effect to that of the foregoing embodiment can be achieved.

(3-3) In the foregoing embodiment, the ATF error signals are converted to digital data to make the tracking control using the average value for each recording unit. However, a similar effect to that of the foregoing embodiment can also be achieved, even when the present invention is so modified as to calculate an average value for each recording track or every predetermined multiple number of tracks.

(3-4) Although the foregoing embodiment has been explained in connection with the case of using the recording track format where the ATF recording region is formed at two locations, i.e., at the lower and upper ends of each recording track, the present invention is not limited to that format and is also applicable to, for example, the case of using a recording track format where one or more ATF recording regions are additionally disposed at the central portion of the recording track to provide three or more ATF recording regions in total.

(3-5) Although the foregoing embodiment has been explained in connection with the case of applying the present invention to the tracking control circuit for a rotary head type digital audio tape recorder, the present invention is not limited to that embodiment and is also suitable for wide application to tracking control circuits for magnetic recording/reproducing apparatus, such as data recorders, which have magnetic tapes wound around rotary drums and helically scanned by rotary heads.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A tracking control circuit for a magnetic recording/reproducing apparatus of the type having rotary drum mounted, first and second rotary heads having different azimuth angles from each other for scanning a magnetic tape and reproducing recorded data from a set of first recording tracks recorded on the magnetic tape at a first azimuth angle and a set of second recording tracks recorded on the magnetic tape at a second azimuth angle and inbetween the set of first recording tracks, the first azimuth angle and the second azimuth angle being in different oblique directions relative to the running direction of the magnetic tape, wherein the improvement comprises:

means for reproducing ATF synchronizing signals from a given second recording track and ATF pilot signals recorded in two locations on each of the first recording tracks on opposite sides of the given second recording track, generating plural tracking error information data from the reproduced ATF pilot signals by digitally sampling and converting the reproduced ATF pilot signals by means of the reproduced ATF synchronizing signals into digital ATF pilot data, subtracting the digital ATF pilot data from the corresponding two locations of the first recording tracks on opposite sides of the given second recording track, and repeating these steps for at least the next recording track after the given second recording track; and tracking control means supplied with the plural tracking error information data for controlling the feed speed of the magnetic tape relative to the first and second rotary heads dependent on an average value of the plural tracking error information data, wherein the tracking control means includes:

means for generating drum frequency signal pulses for representing a rotating frequency of a rotary drum;

an internal counter supplied with the drum frequency signal pulses for counting incrementally at the timing of each drum frequency signal pulse;

an internal register for accumulating the plural tracking error information data at intervals each time the internal counter counts up to a predetermined value; and calculating means for calculating an average of the accumulated value of the plural tracking error information data after both the first recording track and the second recording track have been scanned during one complete rotation of the first rotary head or the second rotary head.

2. A tracking control circuit as claimed in claim 1 wherein the calculating means clears the internal register when the average of the tracking error information data has been calculated.

3. A tracking control circuit as claimed in claim 1 wherein the calculating means resets the internal counter after both the first recording track and the second recording track have been scanned.

4. A tracking control method for a magnetic recording/reproducing apparatus of the type having rotary drum mounted, first and second rotary heads having different azimuth angles from each other for scanning a magnetic tape and reproducing recorded data from a set of first recording tracks recorded on the magnetic tape at a first azimuth angle and set of second recording tracks recorded on the magnetic tape at a second azimuth angle and inbetween the set of first recording tracks, the first azimuth angle and the second azimuth angle being in different oblique directions relative to the running direction of the magnetic tape, wherein the improvement comprises the steps of:

reproducing ATF synchronizing signals from a given second recording track and ATF pilot signals recorded in two locations on each of the first recording tracks on opposite sides of the given second recording track, generating plural tracking error information data from the reproduced ATF pilot signals by digitally sampling and converting the reproduced ATF pilot signals by means of the reproduced ATF synchronizing signals into digital ATF pilot data, subtracting the digital ATF pilot data from the corresponding two locations of the first recording tracks on opposite sides of the given second recording track, and repeating these steps for at least the next recording track after the given second recording track;

on the basis of the plural tracking error information data, controlling the feed speed of the magnetic tape relative to the first and second rotary heads dependent on an average value of the plural tracking error information data;

generating drum frequency signal pulses for representing a rotating frequency of the rotary drum;

electronically counting incrementally at the timing of each drum frequency signal pulse;

accumulating in an internal register the plural tracking error information data at intervals each time the count reaches a predetermined value;

calculating an average of the accumulated value of the plural tracking error information data after the first recording track and the second recording track have been scanned; and controlling the feed speed of the magnetic tape relative to the first and second rotary heads dependent on the average of the accumulated value of the plural tracking error information data.

5. A tracking control method as claimed in claim 4 further including the step of clearing the internal register when the average of the accumulated value has been calculated.

6. A tracking control method as claimed in claim 4 wherein the calculating step further includes resetting the internal counter after the first recording tracks and the given second recording track have been scanned.

* * * * *